March 4, 1952 F. P. JOHNSON 2,587,854
MATERIAL STORAGE AND HANDLING APPARATUS
Filed June 17, 1946 5 Sheets-Sheet 1

Fred P. Johnson
Inventor

March 4, 1952   F. P. JOHNSON   2,587,854
MATERIAL STORAGE AND HANDLING APPARATUS
Filed June 17, 1946   5 Sheets-Sheet 2

FRED P. JOHNSON
Inventor

By
Attorney

March 4, 1952     F. P. JOHNSON     2,587,854
MATERIAL STORAGE AND HANDLING APPARATUS
Filed June 17, 1946     5 Sheets-Sheet 3

Fred P. Johnson
Inventor

By
Attorney

March 4, 1952  F. P. JOHNSON  2,587,854
MATERIAL STORAGE AND HANDLING APPARATUS
Filed June 17, 1946  5 Sheets-Sheet 4
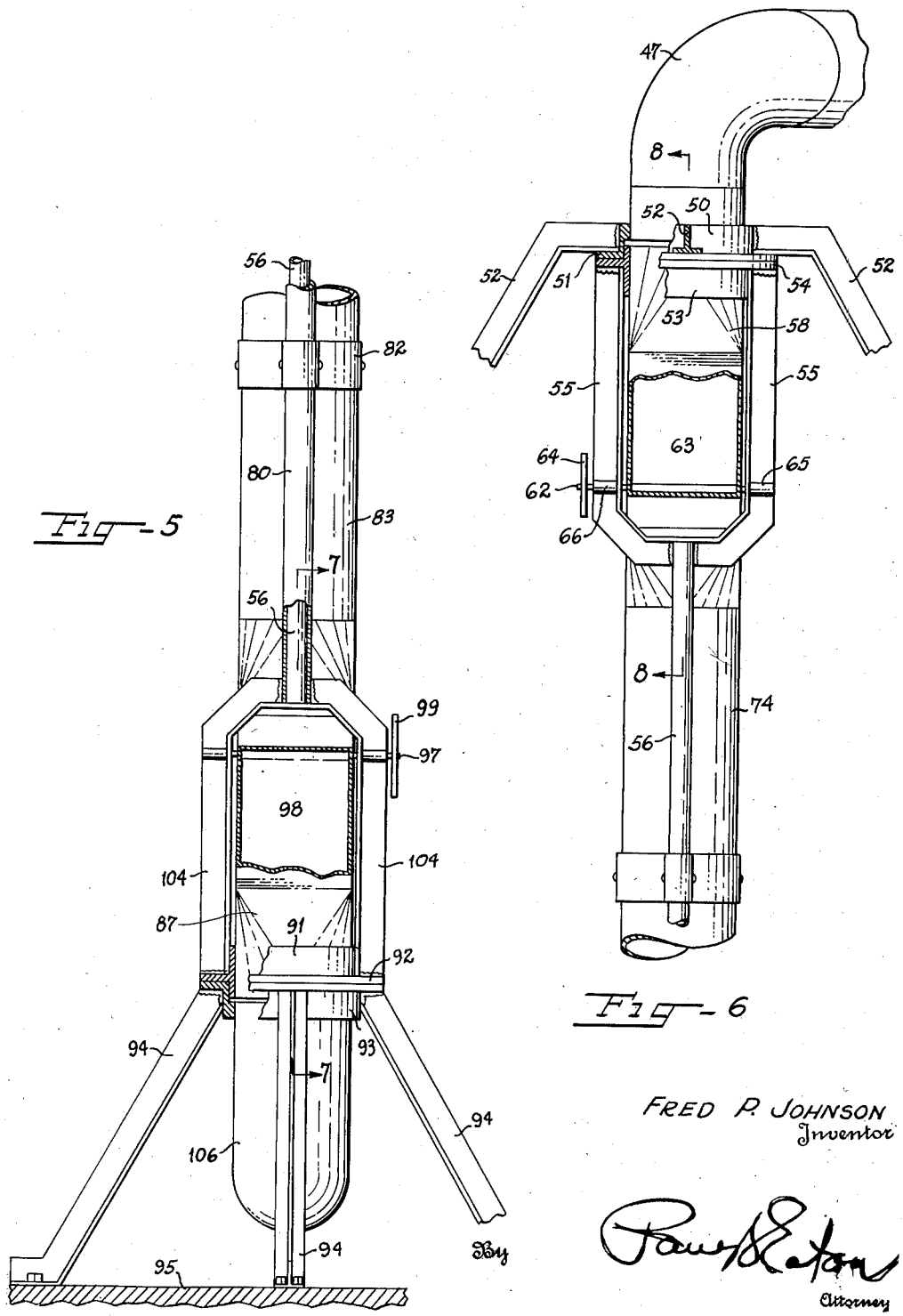
FRED P. JOHNSON
Inventor March 4, 1952
F. P. JOHNSON
2,587,854
MATERIAL STORAGE AND HANDLING APPARATUS
Filed June 17, 1946
5 Sheets-Sheet 5
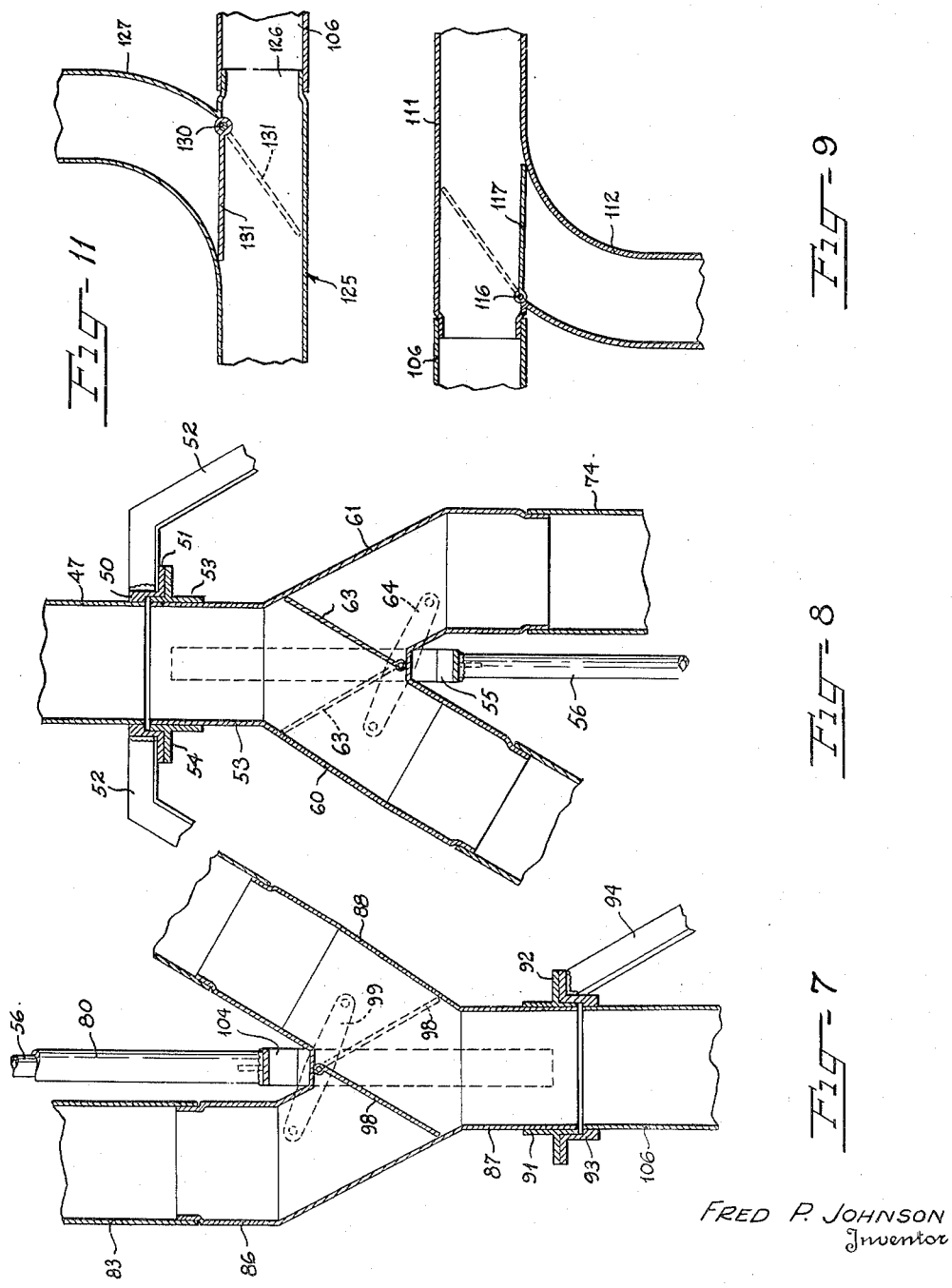
Fred P. Johnson
Inventor Patented Mar. 4, 1952

2,587,854

UNITED STATES PATENT OFFICE 2,587,854

MATERIAL STORAGE AND HANDLING APPARATUS

Fred P. Johnson, Raeford, N. C.

Application June 17, 1946, Serial No. 677,296

8 Claims. (Cl. 214—16)

This invention relates to apparatus for the handling of bulk material, such as cotton fibers, woolen fibers, insulation materials, and in fact any loose material which is light enough to be conveyed by pneumatic means.

It is an object of this invention to provide a storage and fiber handling apparatus comprising a building having means for forcing thereinto bulk material and in providing various compartments within the building into which the fibers are forced, together with means for withdrawing the fibers from any compartment as desired, and delivering the same to the exterior of the building.

It is another object of this invention to provide fiber storage and handling means comprising pneumatic means for forcing the fibers into any one of a plurality of compartments, and also having means for withdrawing the fibers from any desired compartment, and delivering the same to other buildings or to other machines for further processing.

It is another object of this invention to provide a storage building having upper and lower floors and fiber handling apparatus associated therewith to convey the fibrous material selectively into any one of a plurality of storage rooms or compartments disposed on either of said floors, and means for withdrawing the material from any one of the desired compartments and delivering the same to other buildings or to other machines for further processing.

It is a further object of this invention to provide fiber storage and handling means whereby it is possible to convey fibrous material into any one of a plurality of storage compartments and withdraw simultaneously stored material from any of the other compartments to be delivered to other buildings or other machines for further processing.

Some of the objects of the invention having been stated, other objects will appear as the description proceeds, when taken in connection with the accompanying drawings, in which:

Figure 5 is a view partly in section and partly in elevation and taken substantially along the line 5—5 in Figure 3, and showing the pipe and shaft in elevation; except the pipe is broken away in places;

Figure 6 is a view taken substantially along the line 6—6 in Figure 3, and being partly in section and partly in elevation;

Figure 7 is a vertical sectional view taken substantially along the line 7—7 in Figure 5;

Figure 8 is a vertical sectional view taken substantially along the line 8—8 in Figure 6;

Figure 9 is a vertical sectional view through the valve for determining whether the material is withdrawn from the storage house, or withdrawn from a vehicle disposed there below, and relates to the structure shown in the upper right hand corner of Figure 1.

Figure 10 is a sectional plan view taken substantially along the line 10—10 in Figure 3;

Figure 11 is a sectional plan view taken along the line 11—11 in Figure 3.

Figure 1:
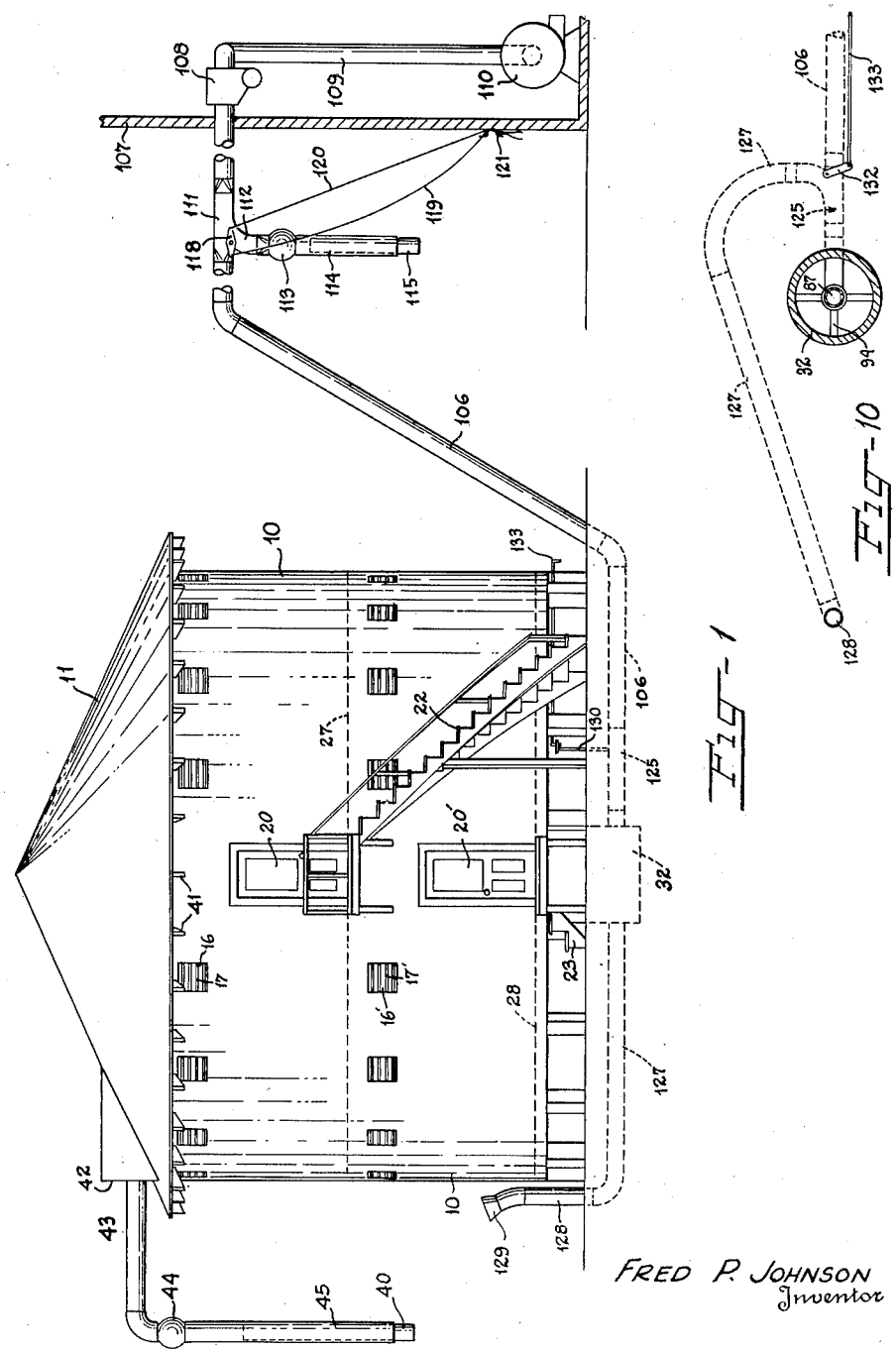
Figure 1 is an elevation of a building equipped with my apparatus.
Figure 2:
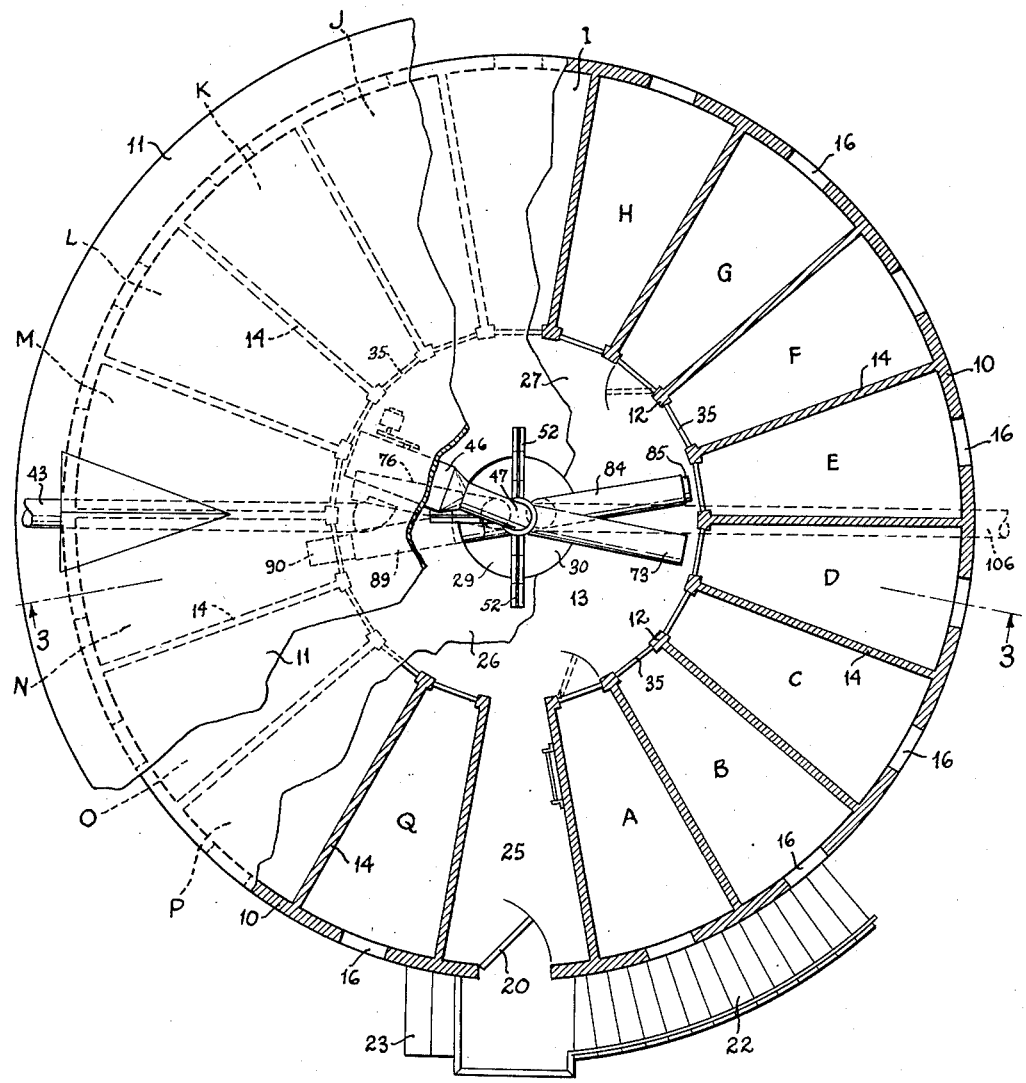
Figure 2 is a top plan view of the building shown in Figure 1 with some of the top portions thereof broken away.

Referring more specifically to the drawings, the numeral 10 indicates the outer wall of a suitable storage house having a suitable roof 11, and having an inner circular wall 12 providing a circular space 13 at the center of the building. This building is divided into a plurality of compartments A to Q inclusive by means of radially disposed walls 14 extending between the inner wall 12 and the outer wall 10. The floor plan of the lower story of the building is the same as the top story and like reference characters are used for the lower story, where the structure is shown, with the prime notation added. Each of the compartments A to Q inclusive has a window or opening 16, which has suitable louvers 17 therein to prevent blowing rains from entering these windows, and each of these windows is completely covered on the inside by means of a suitable screen 18 to prevent material, such as cotton, from being blown out of the window when it is delivered into the compartment. The building has upper and lower stories, but the structure is the same and like reference characters will apply with the prime notation added.

The building also has doors 20 and 20' to permit ingress or egress to the upper and lower stories respectively. Suitable steps 22 and 23 are provided leading to these doors. Leading from each of the doors is a hallway 25 and 25', which permits a person to gain access to the space within the inner circular wall 13. The building is provided with an upper ceiling 26 and a lower ceiling 27 and a floor 28. These ceilings 26 and 27 have suitable circular openings 29 and 30 at their central portions for the installation of apparatus to be presently described. The floor 28 has a suitable opening 31 disposed above a well 32 for the installation of suitable withdrawing apparatus to be presently described.

Circular wall 12 of the upper and lower stories of this building is almost completely formed by a plurality of doors 35, having a suitable lock or latch mechanism 36 for latching the same in closed position. Above each of these doors in an ingress hole 37 through which fibers may be blown into a particular compartment. The bottom of each door 35 has a separately hinged portion 38 through which materials may be withdrawn in a manner to be presently described.

The roof 11 is supported by any suitable means, such as rafters 41, and it has a dormer window, indicated at 42, through which a suction pipe 43 is led. This suction pipe has a conventional universal joint 44 to which a telescopic pipe 45 is secured, so that this pipe can be let down into a wagon or truck loaded with cotton to withdraw the cotton therefrom. The pipe 43 leads to a combined suction and blower fan 46, which has an output pipe 47 leading therefrom, which turns downwardly and fits into an annular member 50, which has an outturned horizontal annular portion 51, the member 50 having secured to its exterior suitable legs 52, which are secured on top of the ceiling 26 outside of the opening 29.

Rotatably mounted in annular member 50 is another annular member 53, which has a horizontally disposed flange 54, which is welded to a suitable U-shaped member 55, which has its lower end welded to the upper end of a pipe 56. Secured on the inside surface of annular member 53 is a casing 58, which projects downwardly and is forked into two pipes 60 and 61. Mounted in the casing 58 is a transverse shaft 62 to which is welded the lower end of a vane 63, which has a double ended lever 64 secured on its outer end. The shaft 62 is likewise mounted for rotation in bearings 65 and 66 in the U-shaped member 55. To the free ends of lever 64 are secured cords 67 and 68 which may be wound one at a time around a handle member 70 to set the vane 63 in one of two positions, that is, either the dotted line position, shown in Figure 8, or the bold line position, to direct the incoming cotton or the fibers or other material into either the branch 60 or 61 of the casing 58.

Secured to branch 60 in a delivery pipe 73, which is adapted to coincide with one of the openings 37 in the upper story of the building, and connected to branch 61 is a downwardly directed pipe 74, which is supported on the pipe 56 by suitable strap members 75. This pipe 74 projects downwardly through opening 30, and is bent at right angles and has a delivery portion 76 adapted to coincide with one of the openings 37' in one of the compartments in the lower story. By rotating the shaft 62 to hold line position in Figure 8, the incoming material will be delivered through pipe 73 to one of the upper compartments, whereas by rotating the shaft 62 to the dotted line position, shown in Figure 8, the material will be delivered through pipe 74 and discharge pipe 76 into one of the lower compartments.

Rotatably mounted around pipe 56 is a larger pipe 80 to which is secured by means of suitable strap members 81 and 82 a downwardly pipe 83, which has an elbow at its upper end and has a horizontal portion 84 which houses a telescopic pipe 85, which is adapted to be projected through the opening formed by opening one of the doors 38 into the lower part of one of the upper compartments for withdrawing material therefrom. The material being withdrawn from a compartment is preferably fed to the suction pipe by an operator located within the compartment.

Pipe 83 projects downwardly and is connected to a branch section 86 of a Y-casing 87, which also has a branch 88. The branch 88 has connected thereto a pipe 89, which projects upwardly and laterally and has a pipe 90 telescopically mounted therein, which may be pushed through the space formed by opening the door 38' to one of the lower compartments.

The lower end of Y-casing 87 fits into an annular member 91, which has a horizontal flange 92, which is adapted to rest on the horizontal portion of an annular member 93, which is supported by a plurality of legs 94 secured on the floor 95 of a well 32 extending below the centrally disposed opening 31.

Mounted in the Y-casing 87 is a transverse shaft 97, which has a vane 98 thereon and on the exterior of the Y-casing 87 is a double ended lever 99, to which cords 100 and 101 may be secured and one of these cords may be wound around a handle 102, disposed on pipe 80. By this means, the vane 98 can be turned to bold line or dotted line position, as shown in Figure 7, to withdraw material from one of the upper compartments or one of the lower compartments, as desired. The annular member 92 has an inverted U-shaped member 104 to the upper end of which is welded pipe 80, whereas pipe 56 extends down to the upper portion of inverted U-shaped member 104, but is not secured thereto so that pipe 56 can be rotated independently of pipe 80. Fitting into annular member 93 is a suction pipe 106 which leads beneath the building and goes to a suitable gin house and the like 107, and leads to a conventional condenser or "dropper" 108 and from the other side of this member 108 a suction pipe 109 leads to a suction fan 110.

The pipe 106 has a casing 111 disposed therein which has a downwardly projected portion 112, having a conventional universal joint 113 therein from which extends a pipe 114, and in which is telescopically mounted a suction pipe 115. Disposed within this casing 111 is a transverse shaft 116 to which a vane 117 is at one edge secured and on the exterior of the casing 111, the shaft 116 has secured thereto a double ended lever 118 to the free ends of which cords 119 and 120 are secured, and the free ends of these cords can be wound around a suitable fastening device 121 to hold the vane 117, either in bold line position, as shown in Figure 9, or in dotted line position. When in bold line position, the fan 110 will be withdrawing fibers from one of the upper or lower compartments in the storage building, but if a load of cotton and the like should be desired to be withdrawn from a truck or wagon, then the vane 117 can be moved to dotted line position, shown in Figure 9, and the suction pipe 115 can be employed for unloading the truck or wagon and delivering the cotton or other fibers into the interior of building 107.

Figures 3, 4:
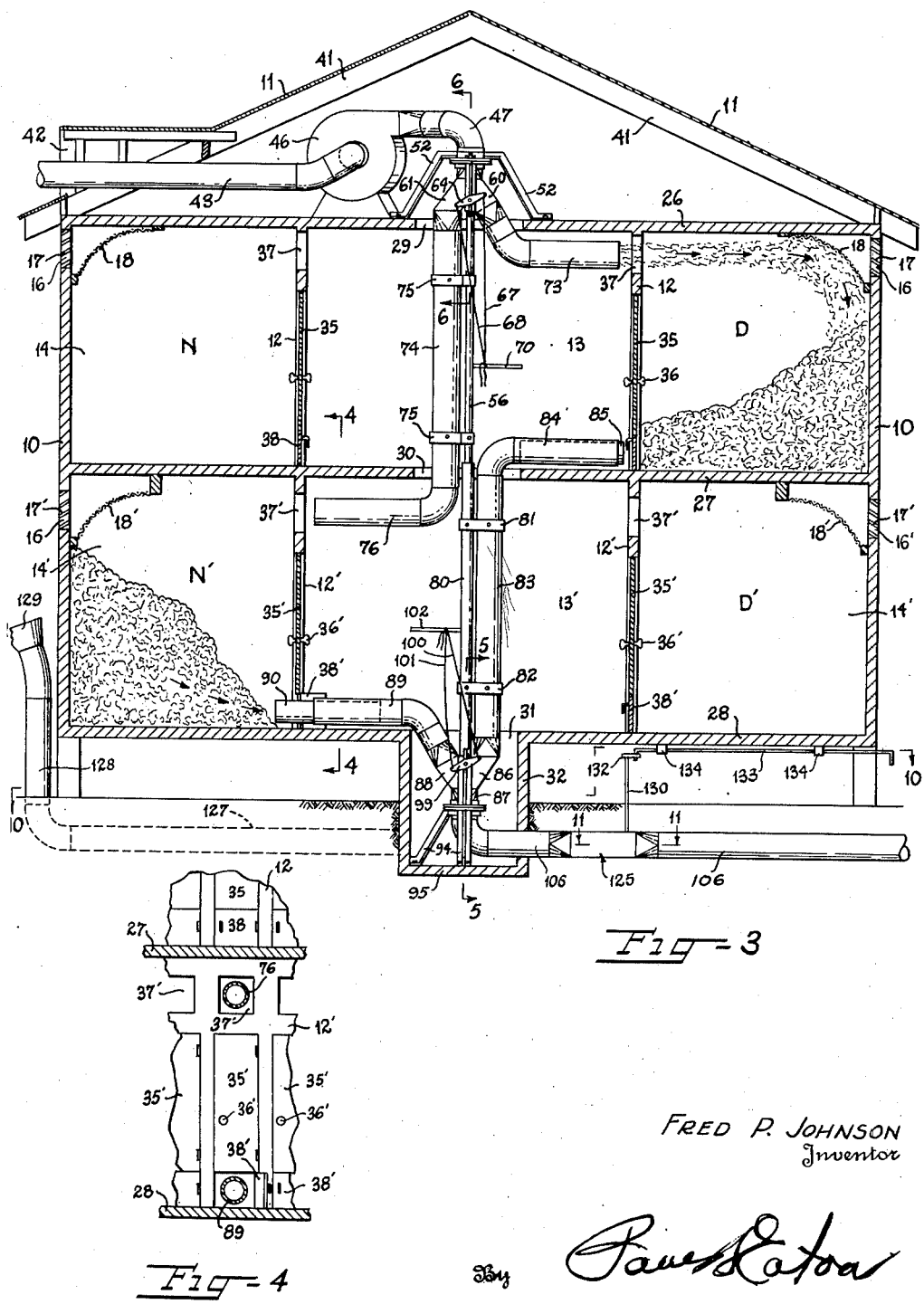
Figure 3 is a vertical sectional view taken through the building, shown in Figure 1, and substantially along the line 3—3 in Figure 2.
Figure 4 is a vertical sectional view taken substantially along the line 4—4 in Figure 3.

The pipe 106 has disposed therein a Y-member or valve casing 125 having a branch 126 which extends in a straight line and is connected to the other portion of pipe 106 remote from the member 93. The valve casing 125 has a pipe 127 also leading therefrom, which is directed reversely and to the left in Figures 1 and 3, and connects to a vertical pipe 128 having an inside diameter of suitable dimensions to slidably but tightly receive a telescopic pipe 40 slidably mounted in pipe 45. The upper end of pipe 128 is funnel shaped as at 129 to make it easy to insert the telescopic pipe 40 thereinto.

Rotatably mounted at the junction point of branches 126 and 127 is a vertical shaft 130 on which is fixedly secured a vane 131. Shaft 130 projects upwardly and has a crank 132 fixedly secured thereon to which is pivotally secured a rod 133 which projects outwardly, to the exterior of the building to a point where it can be engaged by an operator. This rod 133 is slidably supported in guides 134 secured on the lower side of the floor 128 of the building.

The purpose of this arrangement is to permit seed cotton, for example, to be withdrawn from any selected compartment and discharged into another compartment as is occasionally done in the storage of seed cotton. Instead of withdrawing the material from one of the compartments and conducting it to the gin house 107, by turning the vane 131 to the dotted line position shown in Figure 11 and inserting the telescopic pipe 40 into the funnel 129, and starting the suction and blower fan 46, it is then possible to withdraw material through pipe 83 from any one of the upper compartments or through pipe 89 from any one of the lower compartments and direct it back to pipe 43 and through either of the pipes 73 or 76 into any one of the upper or lower compartments. By the handling of the cotton in this manner, it adds value to the finished product, in that the seed cotton is aerated, and its ginning characteristics are greatly improved.

Method of operation

When it is desired to deposit cotton or other loose material into the storage bins A to Q inclusive for the upper story or A' to Q' inclusive for the lower story, the suction and blower fan 46 is started and a telescopic pipe 45 is placed in contact with the materials desired to be stored, and an operator will be standing where he can seize handle 70 and rotate the upper assembly to where pipe 73 and pipe 76 will coincide with one of the openings 37 or 37' and by manipulating the cords 67 and 68, the vane 63 can be turned to either the bold line position in Figure 8 or dotted line position. If it is turned to the bold line position then the material will be blown through pipe 73 and through opening 37 in the selected compartment until the same is filled, the air passing out of this compartment through the opening 16. This filling of one compartment and the passing onto another can be continued until this upper assembly has made almost a complete circle.

If desired, material can be withdrawn from selected compartments while material is being forced into other compartments, or it can be operated separately. In any event, when material is desired to be withdrawn from the lower compartments A' to Q' inclusive, the blower fan 110 is started and the lower assembly comprising pipes 83 and 89 is rotated to where one of the telescopic pipes 85 or 90 coincides with an opening formed by opening one of the lower doors 38 or 38'. Then the vane 98 can be turned to bold or dotted line position, as shown in Figure 7, and the material can be withdrawn either from one of the lower compartments, or from one of the upper compartments, as desired.

While cotton fibers, wool fibers and the like have been referred to throughout this specification, it is desired to be understood that this system can be used for the storage and handling of any material capable of being transferred by pneumatic means.

It is common practice in the storing of seed cotton, for example, to move it from one compartment to another, and when this is desired to be done, the vane 131 can be moved to the dotted line position shown in Figure 11, and with the suction and blower means 46 operating, and extensible pipe 40 inserted into funnel 129 and into pipe 128, any material withdrawn from any one of the compartments, instead of being directed to condenser or separator 108 will be directed back into any desired upper or lower compartment for future storage.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. Apparatus for storing and handling bulk material capable of being transmitted by pneumatic means comprising a building having upper and lower stories, each story having an outer wall and a circular inner wall forming a centrally disposed enclosure, the inner wall of each compartment having an opening near the top thereof and a second opening near the bottom thereof, a rotatable member mounted in the space defined by the inner wall and having two pipes extending therefrom, one pipe extending laterally and registering with the upper openings in the compartments in the upper story and the other pipe extending downwardly and laterally and registering with the upper openings in the compartments of the lower story, suction and blowing means connected to the upper ends of the two pipes for discharging material thereinto, and valved means disposed at the junction of the two pipes for selectively directing material into the upper pipe or the lower pipe for forcing material into one of the upper compartments or one of the lower compartments, and means for rotating said pipes to cause them to register with the upper openings of any desired upper and lower compartments.

2. Apparatus for storing and handling bulk material capable of being transmitted by pneumatic means comprising a building having upper and lower stories, each story having an outer wall and a circular inner wall, the inner wall of each compartment having an opening near the top thereof and a second opening near the bottom thereof, a rotatable member mounted in the space defined by the inner wall and having two pipes extending therefrom, one pipe extending laterally and registering with the upper openings in the compartments in the upper story and the other pipe extending downwardly and laterally and registering with the upper openings in the compartments of the lower story, suction and blowing means connected to the upper ends of the two pipes for discharging material thereinto, valved means disposed at the junction of the two pipes for selectively directing material into the upper pipe or the lower pipe for forcing material into one of the upper compartments, or one of the lower compartments, means for rotating said pipes to cause them to register with the upper openings of any desired upper and lower compartments, a suction pipe leading from the lower portion of the space defined by the inner wall of the lower story, and having a pair of pipes extending upwardly and laterally, one of said pipes being extensible to extend into one of the lower openings in one of the lower compartments and the other pipe being extensible to extend into one of the lower openings in one of the upper compartments, valved means at the junction point of the last-named two pipes disposed in the lower story for selectively applying suction to either one of the pipes in the lower story, said pipes in the lower story being rotatable to cause them to register with a selected lower opening in an upper compartment and in a lower compartment.

3. Means for conveying and storing bulk material capable of being transmitted by pneumatic means, such as vegetable, animal or mineral fibers, comprising a building having an upper story and a lower story and having an outer wall and a circular inner wall forming a circular compartment at the center of the building, and having a plurality of radially disposed partitions dividing the upper and lower stories into a plurality of compartments, each portion of the inner wall associated with each compartment having an upper opening and a lower opening, rotatable means disposed within the space defined by the inner wall for discharging, selectively, material through an upper opening in the upper story or through an upper opening in the lower story, other rotatable means in the lower story in the space defined by the inner wall thereof for withdrawing, selectively, material from a lower opening in one of the upper compartments and one of the lower compartments.

4. Apparatus for storing and withdrawing from storage bulk material, such as various fibers, comprising a building having an upper story and a lower story and having an outer wall and an inner wall, the inner wall being substantially circular in plan, a plurality of radially disposed partitions dividing the upper and lower stories into a plurality of compartments, the inner wall having an upper opening and lower opening therein communicating with each compartment, pneumatic means for delivering material into an upper opening in one of the stories at a time, said pneumatic means being rotatable to cause it to register with an upper opening in one of the compartments in both the upper and lower stories, suction means rotatably mounted in the lower story and having a pair of suction means disposed adjacent the inner wall and having extensible means for extending into the lower openings of said compartments, selectively operated means for creating a suction in one of the last-named means for withdrawing material from a selected compartment.

5. Apparatus for handling bulk material comprising a building having upper and lower stories, each story being divided into a plurality of compartments and each compartment having an opening near the top and an opening near the bottom thereof, rotatable pneumatic means having two pipes, one registering with the upper openings in the upper story, and one registering with the upper openings in the lower story, valved means for directing material through either of the two pipes to the upper or lower compartments, pneumatic means for forcing material through said pipes into the upper or lower compartments, other rotatable suction means having a pair of pipes, one extending to a joint adjacent the lower openings in the upper story and the other extending to a point adjacent the lower openings in the lower story, means for creating a suction in said last-named pipes to withdraw material therethrough and valved means for selectively connecting one of the two last-named pipes to the suction means for withdrawing material from an upper compartment or a lower compartment.

6. Apparatus for storing and handling bulk material capable of being transmitted by pneumatic means comprising a building having upper and lower stories, each story having an outer wall and a circular inner wall, the inner wall of each compartment having an opening near the top thereof and a second opening near the bottom thereof, a rotatable member mounted in the space defined by the inner wall and having two pipes extending therefrom, one pipe extending laterally and registering with the upper openings in the compartments in the upper story and the other pipe extending downwardly and laterally and registering with the upper openings in the compartments of the lower story, suction and blowing means connected to the upper ends of the two pipes for discharging material thereinto, valved means disposed at the junction of the two pipes for selectively directing material into the upper pipe or the lower pipe for forcing material into one of the upper compartments, or one of the lower compartments, means for rotating said pipes to cause them to register with the upper openings of any desired upper and lower compartments, a suction pipe leading from the lower portion of the space defined by the inner wall of the lower story, and having a pair of pipes extending upwardly and laterally, one of said pipes being extensible to extend into one of the lower openings in one of the lower compartments and the other pipe being extensible to extend into one of the lower openings in one of the upper compartments, valved means at the junction point of the last-named two pipes disposed in the lower story for selectively applying suction to either one of the pipes in the lower story, said pipes in the lower story being rotatable to cause them to register with a selected lower opening in an upper compartment and in a lower compartment, a three-way valve disposed in said suction pipe, a branch pipe leading from said three-way valve to a point adjacent the suction side of said suction and blower means, and means for connecting the branch pipe to the suction side of said suction and blower means.

7. Means for conveying and storing bulk material capable of being transmitted by pneumatic means, such as vegetable, animal or mineral fibers, comprising a building having an upper story and a lower story and having an outer wall and a circular inner wall forming a circular compartment at the center of the building, and having a plurality of radially disposed partitions dividing the upper and lower stories into a plurality of compartments, each portion of the inner wall associated with each compartment having an upper opening and a lower opening, rotatable means disposed within the space defined by the inner wall for discharging, selectively, material through an upper opening in the upper story or through an upper opening in the lower story, other rotatable means in the lower story in the space defined by the inner wall thereof for withdrawing, selectively, material from a lower opening in one of the upper compartments and one of the lower compartments, and means for directing material after it is withdrawn from one compartment to said first rotatable means to be deposited into another compartment.

8. Apparatus for storing and withdrawing from storage bulk material, such as various fibers, comprising a building having an upper story and a lower story and having an outer wall and an inner wall, the inner wall being substantially circular in plan, a plurality of radially disposed partitions dividing the upper and lower stories into a plurality of compartments, the inner wall having an upper opening and lower opening therein communicating with each compartment, pneumatic means for delivering material into an upper opening in one of the stories at a time, said pneumatic means being rotatable to cause it to register with an upper opening in one of the compartments in both the upper and lower stories, suction means rotatably mounted in the lower story and having a pair of suction means disposed adjacent the inner wall and having extensible means for extending into the lower openings of said compartments, selectively operated means for creating a suction in one of the last-named means for withdrawing material from a selected compartment, and means for directing material withdrawn by the suction means back into said pneumatic means for deposit into another compartment.

FRED P. JOHNSON.

REFERENCES CITED

The following references are of record in the file of this patent:

UNITED STATES PATENTS

| Number | Name | Date |
|---|---|---|
| 412,985 | Schnitzler | Oct. 15, 1889 |
| 648,269 | Lamb | Apr. 24, 1900 |
| 867,962 | Finton | Oct. 15, 1907 |
| 1,342,418 | Brahtz | June 8, 1920 |
| 1,766,681 | Payne | June 24, 1930 |
| 1,844,065 | Heintz et al. | Feb. 9, 1932 |
| 1,995,464 | Anderson | Mar. 26, 1935 |